US007020702B2

(12) United States Patent
Clark et al.

(10) Patent No.: US 7,020,702 B2
(45) Date of Patent: Mar. 28, 2006

(54) METHOD AND APPARATUS TO OBTAIN REAL-TIME STATUS INFORMATION FROM A NETWORKED DEVICE

(75) Inventors: Heather Laudan Clark, Lexington, KY (US); Mark Walter Fagan, Lexington, KY (US); Richard Francis Russell, Lexington, KY (US); Michael Ray Timperman, Versailles, KY (US); Jason Eric Waldeck, Lexington, KY (US); Charles Thomas Wolfe, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 708 days.

(21) Appl. No.: 09/956,873

(22) Filed: Sep. 20, 2001

(65) Prior Publication Data

US 2003/0055957 A1    Mar. 20, 2003

(51) Int. Cl.
*G06F 15/173* (2006.01)
(52) U.S. Cl. .................................. 709/224; 709/223
(58) Field of Classification Search ............... 709/224, 709/223
See application file for complete search history.

(56) References Cited

U.S. PATENT DOCUMENTS

| 4,532,625 | A |   | 7/1985  | Stover              |
|-----------|---|---|---------|---------------------|
| 5,220,674 | A |   | 6/1993  | Morgan et al.       |
| 5,323,393 | A |   | 6/1994  | Barrett et al.      |
| 5,333,286 | A |   | 7/1994  | Weinberger et al.   |
| 5,361,265 | A |   | 11/1994 | Weinberger et al.   |
| 5,506,838 | A |   | 4/1996  | Flanagan            |
| 5,537,626 | A |   | 7/1996  | Kraslavsky et al.   |
| 5,550,957 | A |   | 8/1996  | Davidson, Jr. et al.|
| 5,636,333 | A |   | 6/1997  | Davidson, Jr. et al.|
| 5,651,114 | A |   | 7/1997  | Davidson, Jr.       |
| 5,652,839 | A |   | 7/1997  | Giorgio et al.      |
| 5,675,756 | A |   | 10/1997 | Benton et al.       |
| 5,699,494 | A |   | 12/1997 | Colbert et al.      |
| 5,727,135 | A |   | 3/1998  | Webb et al.         |
| 5,764,913 | A |   | 6/1998  | Jancke et al.       |
| 5,841,991 | A | * | 11/1998 | Russell ....................... 709/221 |
| 5,848,318 | A |   | 12/1998 | Okimoto             |
| 5,862,404 | A |   | 1/1999  | Onaga               |
| 5,872,569 | A |   | 2/1999  | Salgado et al.      |
| 5,987,535 | A |   | 11/1999 | Knodt et al.        |
| 5,996,030 | A |   | 11/1999 | Ofer                |
| 6,092,078 | A |   | 7/2000  | Adolfsson           |
| 6,104,499 | A |   | 8/2000  | Yamada              |
| 6,112,247 | A | * | 8/2000  | Williams .................... 709/236 |
| 6,115,545 | A | * | 9/2000  | Mellquist ................... 709/220 |
| 6,188,973 | B1|   | 2/2001  | Martinez et al.     |
| 6,351,468 | B1| * | 2/2002  | LaRowe et al. ............ 370/449 |
| 6,651,100 | B1| * | 11/2003 | Bush et al. ................. 709/224 |

* cited by examiner

*Primary Examiner*—John B. Walsh
(74) *Attorney, Agent, or Firm*—Ronald K. Aust

(57) ABSTRACT

A method of obtaining information from a networked device is provided. The method includes the steps of defining a network; providing a network adapter communicatively connected to the network, the network adapter connected to the networked device; providing memory in the network adapter; updating information in the memory, wherein the information describes a status of the networked device; placing the information into a response frame; and sending the response frame in response to any command frame received by the network adapter.

23 Claims, 3 Drawing Sheets

METHOD AND APPARATUS TO OBTAIN REAL-TIME STATUS INFORMATION FROM A NETWORKED DEVICE

BACKGROUND OF THE INVENTION

1. Field of the Invention

The present invention relates to obtaining information from a networked device, and, more particularly, to obtaining real-time status information from a networked device.

2. Description of the Related Art

In order for an application running on a host networked workstation to display the status of a networked device, the application must interrogate the networked device to obtain status information. This process is costly, in several regards, first multiple queries are required to obtain the necessary information, which leads to excessive network traffic. Secondly, there is additional hardware/firmware complexity in the networked device in order to establish connections between the workstation and the networked device. Thirdly, the networked device may be engaged with other host applications and be unable to respond when queried by an application.

Different sorts of network frames are used to determine several things about a networked device, including: whether or not the device is present and active on the network; whether or not the device is free to establish a networked connection to a host networked device; and the status of the networked device. The networked device is required to respond in various ways depending on the type of status information requested by the host networked device.

What is needed in the art is an apparatus and a method to provide a uniform response of the real-time status of a networked device each time a request is made.

SUMMARY OF THE INVENTION

The present invention provides an apparatus and a method to provide a uniform response of the real-time status of a networked device each time a request is made.

The invention comprises, in one form thereof, a method of obtaining information from a networked device. The method includes the steps of defining a network; providing a network adapter communicatively connected to the network, the network adapter connected to the networked device; providing memory in the network adapter; updating information in the memory, wherein the information describes a status of the networked device; placing the information into a response frame; and sending the response frame in response to any command frame received by the network adapter.

In another form of the invention, an imaging system includes a network, at least one workstation communicatively connected to the network and an imaging device. The imaging device includes a network adapter communicatively connected to the network, a print engine and a memory. The print engine, the memory and the network adapter are communicatively connected. The print engine stores and updates information in the memory, the information describing the status of the print engine. The network adapter performs an instruction of placing the information into a response frame and the network adapter performs an instruction of sending the response frame in response to any command frame received by the network adapter.

An advantage of the present invention is that real-time device status information is obtained by a workstation.

Another advantage is that device status information is available from a networked device even though the networked device is servicing another application or workstation.

Yet another advantage is that uniform device status information is sent in response to all command frames. This eliminates the need to support specific status information requests, thus reducing the cost of a networked device.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
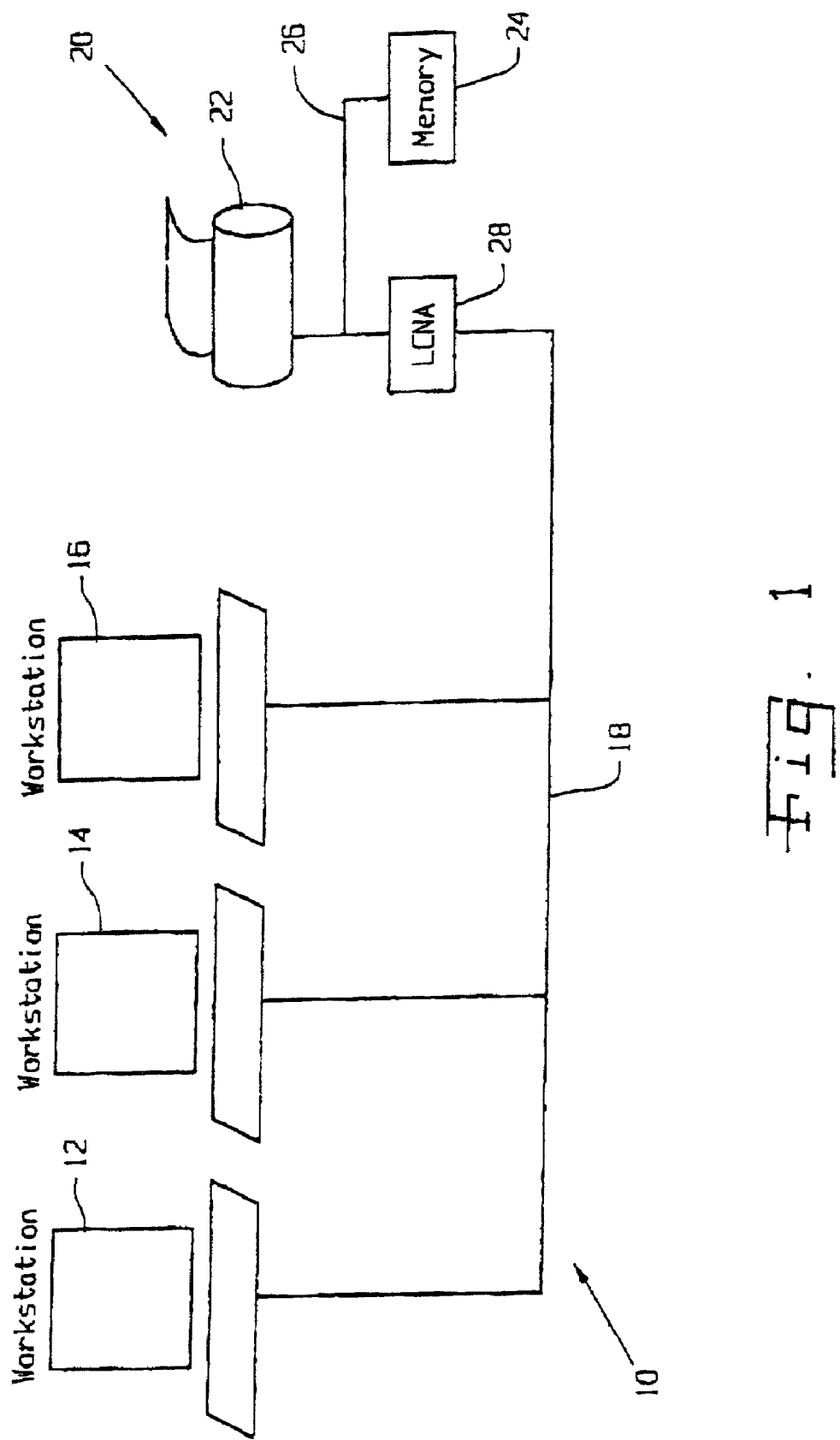
FIG. 1 is a schematic block diagram of an imaging system embodying the present invention.

Referring now to the drawings and particularly to FIG. 1, there is shown an imaging system 10 including a workstation 12, a workstation 14, a workstation 16, a network 18 and a networked device 20.

Workstations 12, 14 and 16 are computers which are communicatively connected to networked device 20 by way of network 18. Although three workstations are shown networked in FIG. 1, these are representative of any number of workstations connected to network 18.

Network 18 provides communicative interconnection between workstations 12, 14 and 16 and networked device 20 and any other devices connected thereto.

Networked device 20 includes a print engine 22, a memory 24, an interconnection 26 and a low cost network adapter (LCNA) 28. Networked device 20 may be an imaging device, such as a printer. In the embodiment of the invention described herein, networked device 20 will be in the form of a printer.

Print engine 22 receives printer control information and print data from LCNA 28, processes the information and data and produces a printed page. Print engine 22 updates device status information in memory 24 relative to the status of print engine 22. The device status information delivered to memory 24 by print engine 22 includes, such things as, whether print engine 22 is busy or idle, if paper is jammed, if paper is available, ink levels, head alignment settings, configuration and cartridge status. Real-time delivery of device status information by print engine 22 to memory 24 occurs asynchronously to the functioning of network 18 and LCNA 28. Print engine 22 updates memory 24 when status or configuration of print engine 22 changes. Such an arrangement allows LCNA 28 to provide a quick uniform response on the status of networked device 20 by retrieving device status information from memory 24.

Memory 24 is interconnected with print engine 22 and LCNA 28. Memory 24 contains device status information on the status of networked device 20. Print engine 22 stores device status information in memory 24 on a real-time basis as the status of print engine 22 changes. The device status information stored in memory 24 is utilized by LCNA 28 when LCNA 28 responds to an inquiry sent from a workstation such as workstation 12, 14 or 16.

Interconnection 26 provides a communication link between print engine 22, memory 24 and LCNA 28 of networked device 20. Interconnection 26 facilitates the sharing of information among two or more of print engine 22, memory 24 and LCNA 28.

LCNA 28 receives all network traffic directed to networked device 20 by way of network 18. Print engine 22 relies on LCNA 28 to deliver printer control information and print data thereto. Workstations 12, 14 or 16 send any of several types of frames to LCNA 28. For certain types of frames received by LCNA 28, LCNA 28 prepares a response and sends that response on network 18.

Figure 2A:
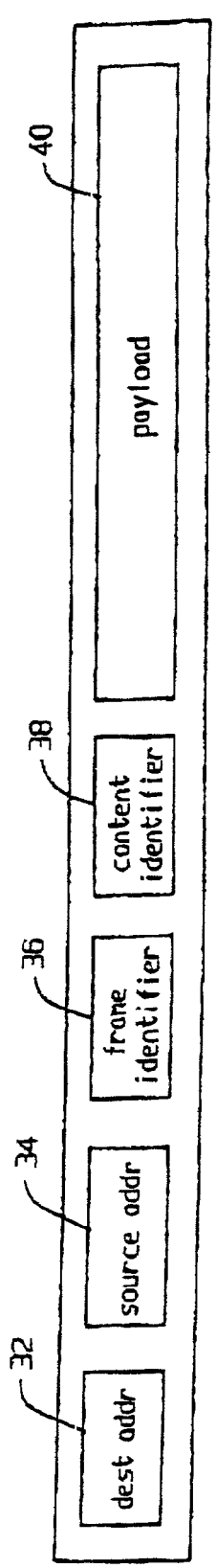
FIG. 2A is a schematic block diagram of a request frame generated within the imaging system and directed toward a networked device embodying the present invention of FIG. 1.
Figure 2B:
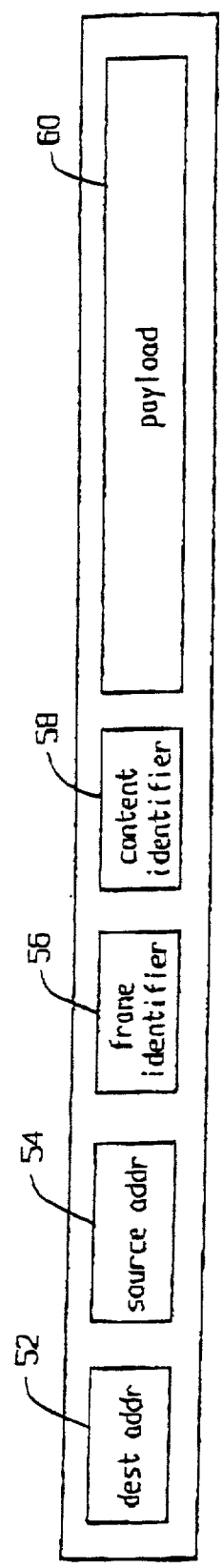
FIG. 2B is a schematic block diagram of a response frame generated by a networked device in response to a command frame of FIG. 2A.

Now additionally referring to FIGS. 2A and 2B, there is shown a request frame 30 and a response frame 50. Request frame 30 is transmitted by a workstation on network 18 and is received by LCNA 28. LCNA 28 responds to the receipt of request frame 30 in the form of response frame 50.

Request frame 30 includes a destination address 32, a source address 34, a frame identifier 36, a content identifier 38 and a payload field 40.

Destination address 32 is the address of the device on network 18 to which request frame 30 is directed.

Source address 34 is the address of the device on network 18 from which request frame 30 originated.

Frame identifier 36 identifies the frame being sent on network 18.

Content identifier 38 contains a value which defines the type of the frame which is one of a data frame, a configuration frame, or a command frame.

The configuration frame relates to establishing an IP address for LCNA 28 on network 18.

A data channel includes a set of data frames. A data frame is used to send print objects from a workstation 12, 14 or 16 to networked device 20, by way of LCNA 28, using payload field 40. Only one workstation is allowed to 'own' the data channel at a time, such workstation is known as an "Owner Workstation". Any frame received by LCNA 28 in the form of a data frame that does not originate from the Owner Workstation is disregarded by LCNA 28.

Any workstation can send a command frame to LCNA 28, to which LCNA 28 will always respond. The command frame may be one of a "Status" request, a "Connect" request, a "Close" request or a "Terminate" request. In response to any request received by way of the command frame, LCNA 28 reads the device status information stored in memory 24 and includes the device status information in response frame 50 to send as a response to the workstation having sent the command frame.

Payload 40 may include data to be utilized by LCNA 28 or print engine 22.

Response frame 50 includes a destination address 52, a source address 54, a frame identifier 56, a content identifier 58 and a payload field 60. Response frame 50 is generated in response to any command frame received by LCNA 28.

Destination address 52 is the address of the device on network 18 to which response frame 50 is directed. LCNA 28 places the contents of source address 34 of request frame 30 into destination address 52.

Source address 54 is the address of the device on network 18 from which response frame 50 originated. The contents of source address 54 is the address of LCNA 28 which is also the contents of destination address 32.

Frame identifier 56 identifies the frame being sent on network 18. LCNA 28 copies the contents of frame identifier 36, of request frame 30, into frame identifier 56, hence LCNA 28 is echoing back the same information sent.

Content identifier 58 contains a value which defines the frame as a response frame.

Payload 60 in response frame 50 contains a network address, a current IP address, a current name of networked device 20, a number of forward data frame buffers supported by networked device 20, an IP address of the current data channel owner (0.0.0.0 if there is no data channel owner), a UDP port of the current data channel owner (0 if there is no data channel owner), a unique device dependent identifier and a fixed length device dependent data structure. The workstation receiving response frame 50 retrieves the portion of information desired from the payload 60 and disregards the rest of the contents of payload 60.

Now additionally referring to FIG. 3, there is depicted a plurality of processing steps, typically executed by an LCNA equipped device on a network in response to the receipt, by LCNA 28, of a command frame, as more fully described below.

Figure 3:
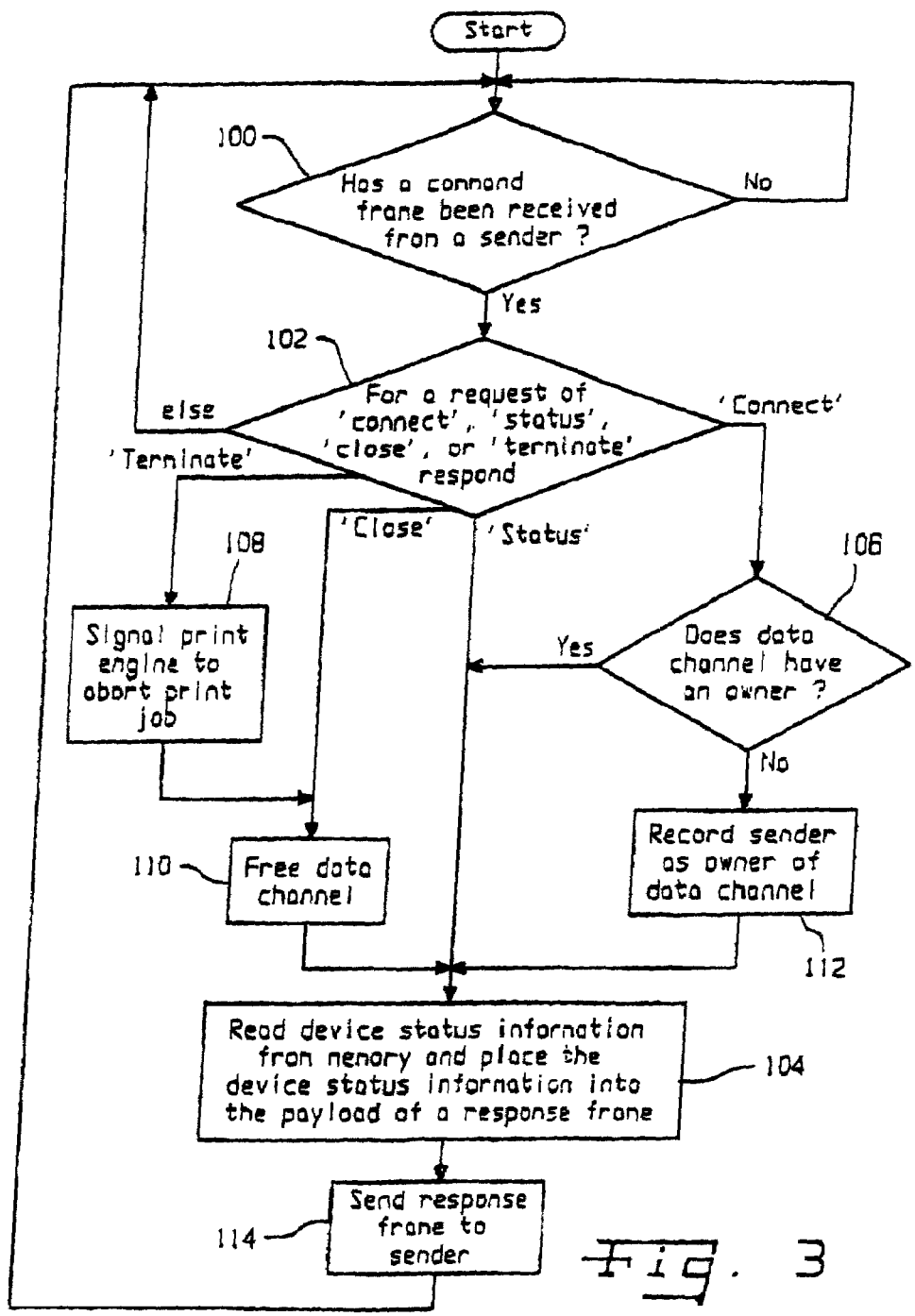
FIG. 3 depicts a flow diagram of a process for responding to a command frame in the imaging system of FIGS. 1, 2A and 2B.

The process of FIG. 3 is initiated when LCNA 28 receives a command frame from a workstation.

At the point of beginning of the process, and specifically prior to step 100, workstation 12, 14 or 16 sends a request frame 30 on network 18 to networked device 20 by way of LCNA 28. LCNA 28 receives request frame 30 and at step 100 LCNA 28 determines whether the received frame is a command frame.

If, at step 100, LCNA 28 determines that a command frame has not been received from a "Sender" the process returns to the point of beginning. A Sender is the workstation located at source address 34 of a received frame.

If, at step 100, LCNA 28 determines that a command frame has been received from a Sender the process continues at step 102.

At step 102, LCNA 28 determines whether the command frame is a Status request, a Connect request, a Close request or a Terminate request.

If, at step 102, LCNA 28 does determine that a Status request has been received then the process continues at step 104.

If, at step 102, LCNA 28 does determine that a Connect request has been received then the process continues at step 106.

If, at step 102, LCNA 28 does determine that a Terminate request has been received then the process continues at step 108.

If, at step 102, LCNA 28 does determine that a Close request has been received then the process continues at step 110.

If, at step 102, LCNA 28 determines that the command frame is not a Status request, a Connect request, a Close request or a Terminate request, then the process returns to the point of beginning.

At step 104, LCNA 28 retrieves device status information from memory 24 and assembles it as payload 60 of response frame 50. LCNA 28 also places source address 34 into destination address 52, destination address 32 into source address 54, frame identifier 36 into frame identifier 56 and sets content identifier 58 to indicate a response frame. The process then continues at step 114.

At step 106, LCNA 28 determines if the data channel is owned by a workstation. The ownership of the data channel signifies that for the duration of ownership only data from the Owner Workstation can be accepted. No more than one workstation can own the data channel at any particular time. LCNA 28 does accept frames from other workstations as described herein, but LCNA 28 will accept data only from the Owner Workstation.

If, at step 106, LCNA 28 determines that the data channel does have an owner, then process flow continues at step 104.

If, at step 106, LCNA 28 determines that the data channel does not have an owner, then process flow continues at step 112.

At step 108, LCNA 28 communicates with print engine 22 to terminate any print job that print engine 22 may be printing. The process flow then continues at step 110.

At step 110, LCNA 28 frees the data channel, thus the data channel is no longer owned. The process flow then continues at step 104.

At step 112, LCNA 28 records the Sender as the Owner Workstation of the data channel. The process flow then continues at step 104.

At step 114, LCNA 28 sends response frame 50 to the Sender and the process returns back to the point of beginning.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of obtaining information from a networked device, comprising the steps of:
   defining a network;
   providing a network adapter communicatively connected to said network, said network adapter connected to said networked device;
   providing memory in said network adapter;
   updating information in said memory, wherein said information describes a status of said networked device;
   placing said information into a response frame; and
   sending said response frame in response to any command frame received by said network adapter,
   wherein said sending said response frame in response to any command frame received by said network adapter includes sending said response frame in response to each of a Status request, a Connect request, a Close request and a Terminate request received by said network adapter.

2. The method of claim 1, wherein said updating step is performed upon a change in at least one of a status and a configuration of said networked device.

3. The method of claim 1, wherein said command frame includes a Status request, said method then performing said placing step and performing said sending step.

4. The method of claim 1, wherein said placing step is performed when said network adapter receives said command frame.

5. A method of obtaining information from a networked device, comprising the steps of:
   defining a network;
   providing a network adapter communicatively connected to said network, said network adapter connected to said networked device;
   providing memory in said network adapter;
   updating information in said memory, wherein said information describes a status of said networked device;
   placing said information into a response frame; and
   sending said response frame in response to any command frame received by said network adapter,
   wherein said command frame includes a Connect request, said method then further comprising the step of determining if a data channel has an owner.

6. The method of claim 5, wherein said data channel does not have an owner, said method then further comprising the steps of:
   recording a sender of said command frame as said owner of said data channel;
   performing said placing step; and
   performing said sending step to send said response frame to said sender of said command frame.

7. The method of claim 5, wherein said data channel has an owner, said method then performing said placing step and performing said sending step to send said response frame to a sender of said command frame.

8. The method of claim 5, wherein said updating step is performed upon a change in at least one of a status and a configuration of said networked device.

9. The method of claim 5, wherein said placing step is performed when said network adapter receives said command frame.

10. A method of obtaining information from a networked device, comprising the steps of:
    defining a network;
    providing a network adapter communicatively connected to said network, said network adapter connected to said networked device;
    providing memory in said network adapter;
    updating information in said memory, wherein said information describes a status of said networked device;
    placing said information into a response frame; and
    sending said response frame in response to any command frame received by said network adapter,
    wherein said command frame includes a Close request, said method then further comprising the steps of:
    freeing a data channel;
    performing said placing step; and
    performing said sending step to send said response frame to a sender of said command frame.

11. A method of obtaining information from a networked device, comprising the steps of:
    defining a network;
    providing a network adapter communicatively connected to said network, said network adapter connected to said networked device;
    providing memory in said network adapter;
    updating information in said memory, wherein said information describes a status of said networked device;
    placing said information into a response frame; and
    sending said response frame in response to any command frame received by said network adapter, wherein said command frame includes a Terminate request, said method then further comprising the steps of:

signaling a printer engine to terminate a print job;

freeing a data channel;

performing said placing step; and performing said sending step to send said response frame to a sender of said command frame.

12. An imaging system, comprising:

a network;

at least one workstation communicatively connected to said network;

an imaging device, comprising:

a network adapter communicatively connected to said network;

a print engine;

a memory, said print engine, said memory and said network adapter being communicatively connected;

wherein said print engine stores and updates information in said memory, said information describing the status of said print engine, said network adapter performs an instruction of placing said information into a response frame and said network adapter performs an instruction of sending said response frame in response to any command frame received by said network adapter, wherein said network adapter performing said instruction of sending said response frame in response to any said command frame received by said network adapter includes said network adapter performing said instruction of sending said response frame in response to each of a Status request, a Connect request, a Close request and a Terminate request received by said network adapter.

13. The imaging system of claim 12, wherein said command frame includes a Status request, and said network adapter then performs said instruction of placing and said instruction of sending.

14. The imaging system of claim 12, wherein said print engine updates said memory upon a change of at least one of a status and a configuration of said print engine.

15. The imaging system of claim 12, wherein said network adapter places said information into said response frame when said network adapter receives said command frame.

16. An imaging system, comprising:

a network;

at least one workstation communicatively connected to said network;

an imaging device, comprising;

a network adapter communicatively connected to said network;

a print engine;

a memory, said print engine, said memory and said network adapter being communicatively connected;

wherein said print engine stores and updates information in said memory, said information describing the status of said print engine, said network adapter performs an instruction of placing said information into a response frame and said network adapter performs an instruction of sending said response frame in response to any command frame received by said network adapter, wherein said command frame includes a Connect request, and said network adapter then determines if a data channel has an owner.

17. The imaging system of claim 16, wherein said data channel has an owner, and said network adapter then performs said instruction of placing and said instruction of sending to send said response frame to a sender of said command frame.

18. The imaging system of claim 16, wherein said data channel does not have an owner, and said network adapter then performs an instruction of recording a sender of said command frame as said owner, said network adapter performing said instruction of placing and said instruction of sending to send said response frame to said sender of said command frame.

19. The imaging system of claim 16, wherein said command frame includes a Status request, and said network adapter then performs said instruction of placing and said instruction of sending.

20. The imaging system of claim 16, wherein said print engine updates said memory upon a change of at least one of a status and a configuration of said print engine.

21. The imaging system of claim 16, wherein said network adapter places said information into said response frame when said network adapter receives said command frame.

22. An imaging system, comprising:

a network;

at least one workstation communicatively connected to said network;

an imaging device, comprising:

a network adapter communicatively connected to said network;

a print engine;

a memory, said print engine, said memory and said network adapter being communicatively connected;

wherein said print engine stores and updates information in said memory, said information describing the status of said print engine, said network adapter performs an instruction of placing said information into a response frame and said network adapter performs an instruction of sending said response frame in response to any command frame received by said network adapter, wherein said command frame includes a Close request, and then said network adapter performs an instruction of freeing a data channel, said network adapter performing said instruction of placing and said instruction of sending to send said response frame to a sender of said command frame.

23. An imaging system, comprising:

a network;

at least one workstation communicatively connected to said network;

an imaging device, comprising:

a network adapter communicatively connected to said network;

a print engine;

a memory, said print engine, said memory and said network adapter being communicatively connected;

wherein said print engine stores and updates information in said memory, said information describing the status of said print engine, said network adapter performs an instruction of placing said information into a response frame and said network adapter performs an instruction of sending said response frame in response to any command frame received by said network adapter, wherein said command frame includes a Terminate request, and then said network adapter performs an instruction of signaling said print engine to terminate a print job and said network adapter performs an instruction of freeing a data channel, said network adapter performing said instruction of placing and said instruction of sending to send said response frame to a sender of said command frame.

* * * * *